United States Patent [19]

Iwao et al.

[11] Patent Number: 5,032,754
[45] Date of Patent: Jul. 16, 1991

[54] PIEZOELECTRIC TRANSDUCER FOR AN ULTRASONIC MOTOR

[75] Inventors: Naoto Iwao; Masayoshi Kinoshita, both of Nagoya; Manabu Yoshimura, Gifu, all of Japan

[73] Assignee: Brother Kogyo Kabushiki Kaisha, Aichi, Japan

[21] Appl. No.: 495,702

[22] Filed: Mar. 19, 1990

[30] Foreign Application Priority Data

Mar. 31, 1989 [JP] Japan .................................. 1-81992
Oct. 31, 1989 [JP] Japan ................................. 1-283478

[51] Int. Cl.⁵ ........................................ H01L 41/08
[52] U.S. Cl. .............................................. 310/323
[58] Field of Search ............... 310/328, 323, 330-333, 310/346, 324, 366, 325, 316, 317

[56] References Cited

U.S. PATENT DOCUMENTS

| | | | |
|---|---|---|---|
| 3,218,488 | 11/1965 | Jacke .................................. | 310/325 |
| 3,390,287 | 6/1968 | Sonderegger .................... | 310/346 X |
| 4,530,138 | 7/1985 | Ritter .............................. | 310/325 X |
| 4,645,964 | 2/1987 | Hiramatsu et al. ................ | 310/323 |
| 4,705,980 | 11/1987 | Mishiro ............................ | 310/325 X |
| 4,764,702 | 8/1988 | Mishiro ............................. | 310/323 |
| 4,812,697 | 3/1989 | Mishiro ............................. | 310/323 |
| 4,893,045 | 1/1990 | Honda .............................. | 310/323 |
| 4,893,046 | 6/1990 | Honda .............................. | 310/323 |

FOREIGN PATENT DOCUMENTS

| | | | |
|---|---|---|---|
| 0058885 | 3/1987 | Japan .................................. | 310/323 |
| 0100179 | 5/1987 | Japan .................................. | 310/323 |
| 116275 | 1/1989 | Japan . | |
| 1430227 | 3/1976 | United Kingdom .................. | 310/323 |

Primary Examiner—Mark O. Budd
Attorney, Agent, or Firm—Oliff & Berridge

[57] ABSTRACT

An ultrasonic motor uses a piezoelectric transducer for effectively transmitting vibration energy and achieving high output. The piezoelectric transducer comprises elastic members, first and second piezoelectric elements, electrodes, and ceramic insulators inserted between the electrodes or between the electrodes and the elastic members. The first and second piezoelectric elements excite the vibration surfaces of the elastic members to vibrate in two modes and to generate approximate elliptical vibration by synthesizing the two vibration modes. The electrodes are provided for applying alternating current signals to the first and the second piezoelectric elements. The first and second piezoelectric elements are polarized such that they cause shear vibration in the same direction. The piezoelectric transducer is fixed in a motor case via a fixing plate. A rotor is provided in such a position as to contact the vibration surface of one of the elastic members.

14 Claims, 5 Drawing Sheets

PIEZOELECTRIC TRANSDUCER FOR AN ULTRASONIC MOTOR

BACKGROUND OF THE INVENTION

1. Field of the invention

The present invention relates to a piezoelectric transducer suitable for use in an ultrasonic motor. Related art The composition and operation of a related-art piezoelectric transducer used in an ultrasonic motor are explained hereinafter with specific reference to FIGS. 5 and FIG. 7.

A first elastic member 302a comprises a cylindrical portion 303a and a resonance disk 304a coaxially mounted on the cylindrical portion 303a. The first elastic member 302a is provided with a penetrating hole along an axis of symmetry of a piezoelectric transducer 301. A first piezoelectric element 306a is provided on the under surface of the cylindrical portion 303a. A third piezoelectric element 310a is provided on the under surface of the resonance disk 304a. A fixing plate 315 is installed under the first piezoelectric element 306a. A second elastic member 302b, a second piezoelectric element 306b, and a fourth piezoelectric element 310b are arranged below the fixing plate 315 so that the piezoelectric transducer 301 is symmetrical about the fixing plate 315.

The piezoelectric transducer 301 constructed as above is fastened together by a bolt 313 penetrating through the penetrating hole and a nut 314. The dimensions of the first and the second elastic members 302a and 302b are determined so that the first and second elastic members 302a and 302b resonate in a shear vibration mode (referred to as peripheral shear vibration hereinafter) and in a flexural vibration mode (referred to as axial flexural vibration hereinafter) at predetermined frequencies.

As shown in FIG. 6B, the first and second piezoelectric elements 306a and 306b are each composed of eight piezoelectric chips 201 arranged in a circle. As shown in FIG. 6B, each piezoelectric chip 201 is cut out of a piezoelectric board 200 in a shape forming one eighth of the circle. The piezoelectric board 200 for generating thickness shear mode vibration has a polarized direction indicated by arrow A as shown in FIG. 6A.

As illustrated in FIG. 7, the piezoelectric chips 201 are assembled in such an arrangement that the first piezoelectric element 306a is polarized in a direction opposite to that of the second piezoelectric element 306b. This arrangement of the piezoelectric chips 201 is suitable for causing torsional vibration of an elastic member. The curved arrows in FIG. 5 indicate the polarized directions of the first and the second piezoelectric elements 306a and 306b.

The piezoelectric transducer 301 is fixed in a motor case 317 via the fixing plate 315. An output shaft 319 is rotatably supported in the motor case 317. One end of the output shaft 319 protrudes out of the motor case 317. A rotor 321 is attached to the other end of the output shaft 319 inside the motor case 310. A spring 323 is interposed between the motor case 317 and the rotor 321, and pushes the rotor 321 onto the resonance disk 304a of the piezoelectric transducer 301.

In the piezoelectric transducer 301 constructed as described above, aluminum disks having the outside diameter of 60 mm and the thickness of 3.5 mm are used as the resonance disks 304a and 304b of the elastic members 302a and 302b, respectively. The amplitude in the peripheral direction of the peripheral shear vibration occurring with the resonance disks 304a and 304b is 0.1 $\mu$m on the peripherals of the resonance disks 304a and 304b when 25 volts are applied to the first and second piezoelectric elements 306a and 306b. The resulting rotational speed of the output shaft 319 is as low as 10 r.p.m. Therefore, the piezoelectric transducer 301 having the first and second piezoelectric elements 306a and 306b arranged as shown in FIG. 7 is insufficient for a use in an ultrasonic motor due to its limited peripheral shear vibration amplitude.

Another problem of the related-art piezoelectric transducer is that its insulating material causes considerable viscous loss and, therefore, does not effectively transmit vibration when used as an insulator provided between piezoelectric elements.

SUMMARY OF THE INVENTION

One object of the present invention is to provide a piezoelectric transducer having low viscous loss to obtain a more effective transmission of the vibration.

Another object of the present invention is to provide a piezoelectric transducer which can create wide amplitude of shear vibration.

A further object of the present invention is to provide a piezoelectric transducer suitable for use in a high output ultrasonic motor.

These and other objects are achieved by the piezoelectric transducer of the present invention, which comprises: first and second disc-shaped elastic bodies having a common axis, where each elastic body resonates in a shear vibration mode and a flexural vibration mode; a fixing plate between the elastic bodies; a first piezoelectric vibrator held between the first elastic body and the fixing plate for causing the first elastic body to vibrate in a first direction in the shear vibration mode; a fourth piezoelectric vibrator held between the second elastic body and the fixing plate for causing the second elastic body to vibrate in the first direction in the shear vibration mode; and a holding means for contacting the first and second elastic bodies at the common axis thereby holding the first piezoelectric vibrator between the first elastic body and the fixing plate and holding the fourth piezoelectric vibrator between the fixing plate and the second elastic body. Insulating elements comprised of ceramic insulation material or metal coated with thermal-sprayed ceramics are used to insulate electrodes of piezoelectric elements used in the piezoelectric vibrators from the elastic bodies, the fixing plate, and/or other electrodes. Additionally, second and third vibrators cause flexural vibration of the elastic body, thereby exciting the vibrators to vibrate in an elliptical movement for driving the rotor of an ultrasonic motor.

The piezoelectric transducer of the present invention is described above can effectively transmit vibration by using ceramic insulators. Moreover, the first and the second piezoelectric elements effectively excite the vibrators to make an approximately elliptical movement, thus rotating the rotor of the ultrasonic motor in a predetermined direction. The piezoelectric transducer of the present invention is thus suitable for use in an ultrasonic motor.

DETAILED DESCRIPTION OF THE PREFERRED EMBODIMENTS

With reference to the attached drawings, preferred embodiments of the present invention are described in detail hereinafter.

Figure 1:
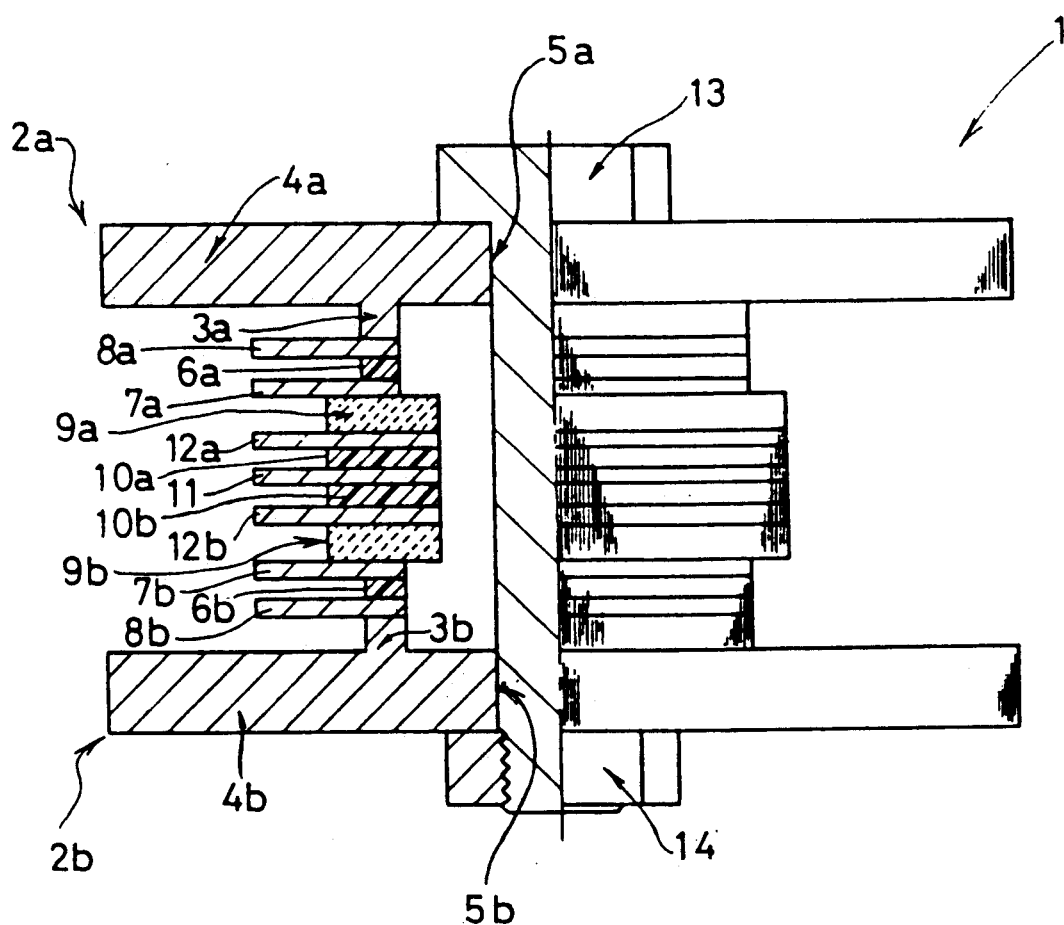
FIG. 1 is a partially sectional view of a piezoelectric transducer of a first embodiment of the present invention.

In FIG. 1 illustrating a piezoelectric transducer 1 of a first embodiment, an elastic member 2a of the piezoelectric transducer 1 comprises a cylindrical portion 3a and a resonance disk 4a coaxially fixed on the cylindrical portion 3a. The elastic member 2a is provided with a penetrating hole 5a along the axis of symmetry of the piezoelectric transducer 1. The resonance disk 4a is constructed to resonate in peripheral shear vibration and axial flexural vibration at predetermined frequencies. A first piezoelectric element 6a, an electrode 7a for applying alternating voltage to the first piezoelectric element 6a, and a ground electrode 8a are provided under the cylindrical portion 3a. The electrode 7a is connected to a first alternating power source (not shown). An insulating ceramic 9a is attached to the lower surface of the electrode 7a. A second piezoelectric element 10a, a electrode 11 for applying alternating current to the second piezoelectric element 10a, and a second ground electrode 12a are installed under the insulation ceramics 9a. The insulating ceramic 9a provides insulation between the electrode 11 and the electrode 8a. Provided under the electrode 11 are an elastic member 2b, a fourth piezoelectric element 6b, an electrode 7b, a ground electrode 8b, an insulating ceramic 9b, a third piezoelectric element 10b, and a ground electrode 12b. The components provided below the electrode 11 correspond to the components above the electrode 11 in such an arrangement that the piezoelectric transducer 1 is symmetrical about the electrode 11. The electrode 11 is connected to a not-shown alternating current source (not shown). The piezoelectric transducer 1 constructed as described above is fastened by a bolt 13 penetrating through the penetrating holes 5a and 5b and a nut 14.

In operation, alternating voltage at a resonance frequency is applied to the electrodes 7a and 7b. Then the first and fourth piezoelectric elements 6a and 6b generate slide mode vibration which causes peripheral shear vibration of the resonance disks 4a and 4b. When alternating voltage at a resonance frequency is applied to the electrode 11, the second and third piezoelectric elements 10a and 10b generate thickness mode vibration which excites the resonance disks 4a and 4b in axial flexural vibration. The vibration energy generated by the first and fourth piezoelectric elements 6a and 6b and the second and third piezoelectric elements 10a and 10b is effectively transmitted to the resonance disks 4a and 4b because insulating ceramics 9a and 9b, which cause only a small viscous loss, are used as the insulators.

The excitation of the first and fourth piezoelectric elements 6a and 6b and the second and third piezoelectric elements 10a and 10b causes vibration of the first and second resonance disks 4a and 4b in two directions. Approximately elliptical vibration is synthesized from the two modes of vibration. The node of the two modes of vibration is located close to the electrode 11.

Figure 2:
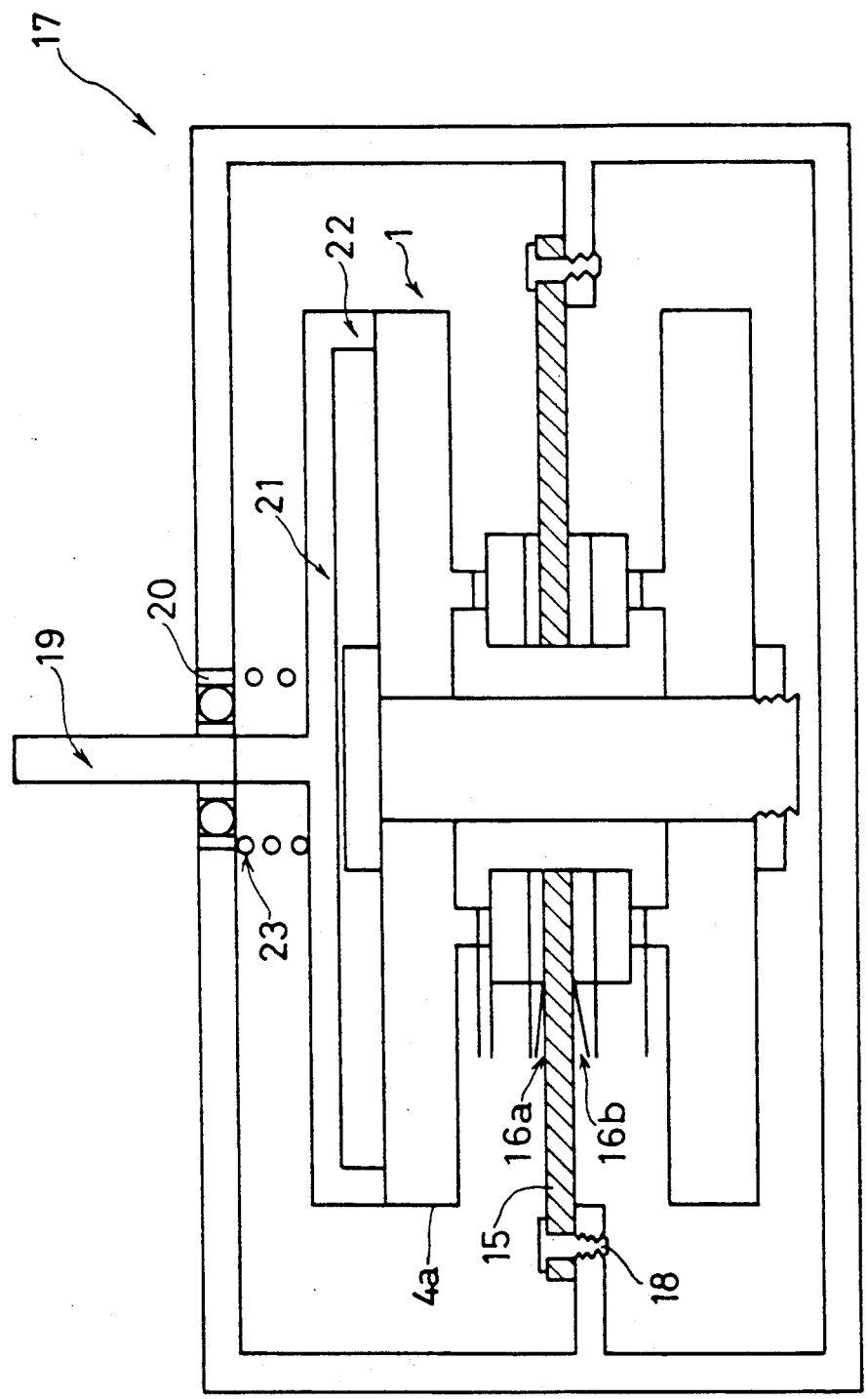
FIG. 2 is a sectional view of an ultrasonic motor of the first embodiment of the present invention.

Referring now to FIG. 2, an ultrasonic motor employing the piezoelectric transducer 1 is explained.

In the piezoelectric transducer 1, the electrode 11 is replaced with a ceramic fixing plate 15 and electrodes 16a and 16b for applying alternating voltage to the second and third piezoelectric elements 10a and 10b. The piezoelectric transducer 1 is fixed in a hollow motor case 17 via the fixing plate 15 by a bolt 18. Since the node of vibration of the piezoelectric transducer 1 is located close to the fixing plate 15, the fixing plate 15 does not vibrate. Therefore, the piezoelectric transducer 1 can be easily fixed to the motor case 17. Further, the fixing plate 15, which is made of ceramic, assures the effective transmission of the vibration energy. An output shaft 19 is rotatably supported via a shaft bearing 20 in the motor case 17. One end of the output shaft 19 protrudes out of the motor case 17. A disk-shaped rotor 21 is attached to the other end of the output shaft 19 inside the motor case 17. A protrusion 22 is provided on the edge of the rotor 21. The rotor 21 contacts one surface of the piezoelectric transducer 1 via the protrusion 22. The rotor 21 is provided with a spring 23 which pushes the rotor 21 onto the resonance disk 4a.

The operation of the above-described ultrasonic motor is as follows.

The resonance disk 4a is excited to generate an approximately elliptical vibration as explained above. While the resonance disk 4a is vibrating in this mode, the direction in which the rotor 21 rotates can be determined by adjusting the phase difference of the alternating voltage applied to the first through fourth piezoelectric elements 6a, 6b, 10a, and 10b. More specifically, the rotor 21 is firmly held against the resonance disk 4a by adjustment of the phase difference when peripheral shear vibration of the resonance disk 4a occurs in one direction. When the peripheral shear vibration occurs in the other direction, the rotor 21 is detached from the resonance disk 4a. In this way, the difference of the peripheral driving force in direction created in the above operation makes the rotor 21 rotate in a predetermined direction. By adjusting the phase difference described above and thus the amplitude of peripheral shear vibration, the rotational speed and the rotational direction of the rotor 21 are determined. The rotation of the rotor 21 is transmitted to the output shaft 19.

Another embodiment of the present invention is described hereinafter.

Figure 7:
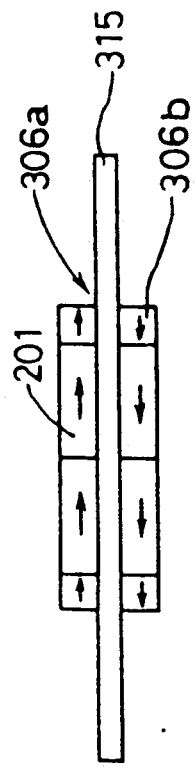
FIG. 7 is a side view of the related-art piezoelectric elements.
Figure 6B:
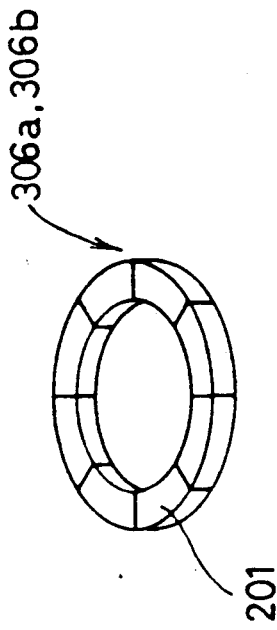
FIG. 6B is a perspective view of a piezoelectric element assembled in a circle.
Figure 3:
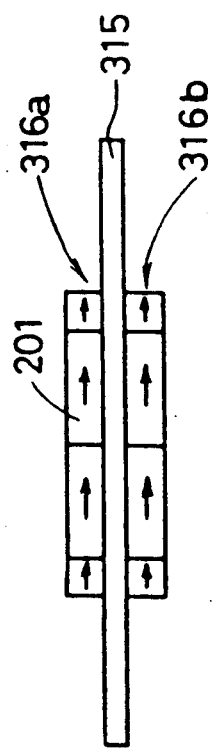
FIG. 3 is a side view of piezoelectric elements of a second embodiment of the present invention.
Figure 6A:
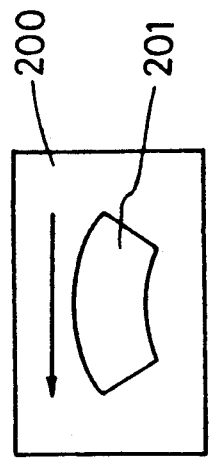
FIG. 6A is a top view of a piezoelectric board.
Figure 4:
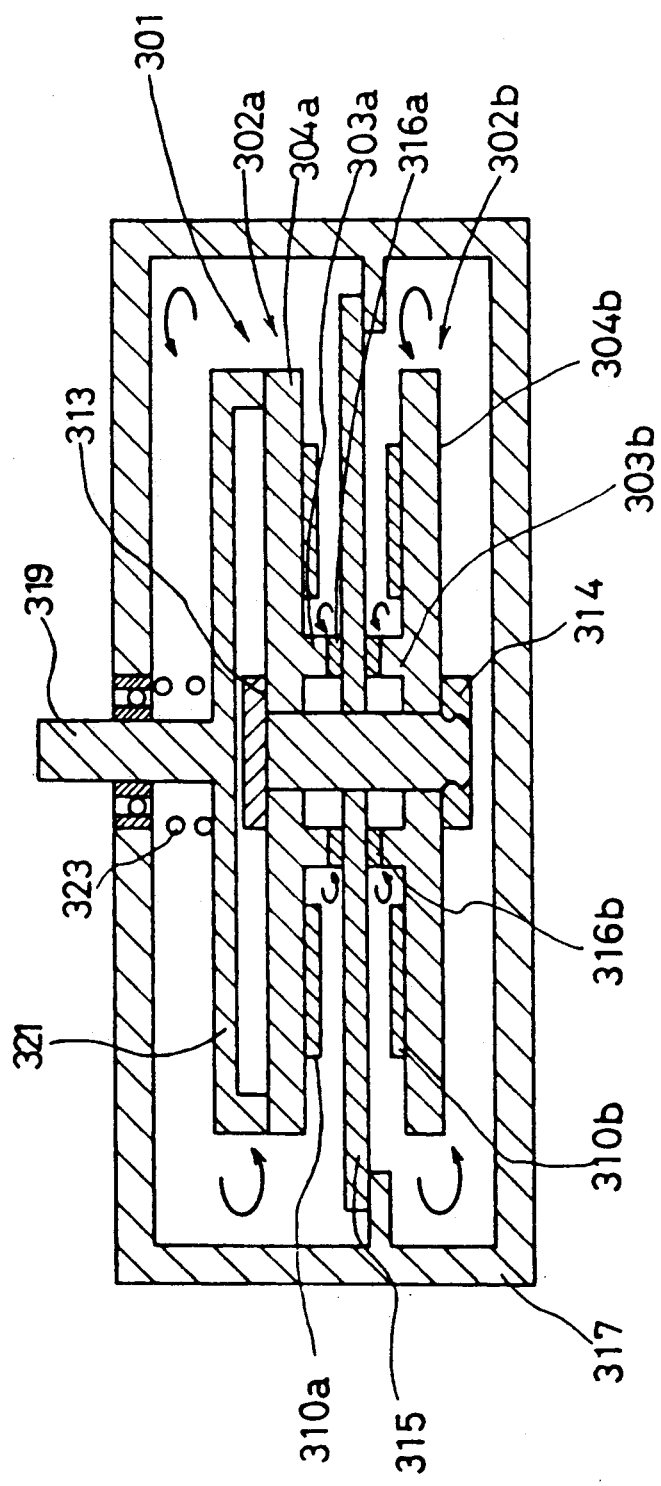
FIG. 4 is a sectional view of an ultrasonic motor of the second embodiment of the present invention.
Figure 5:
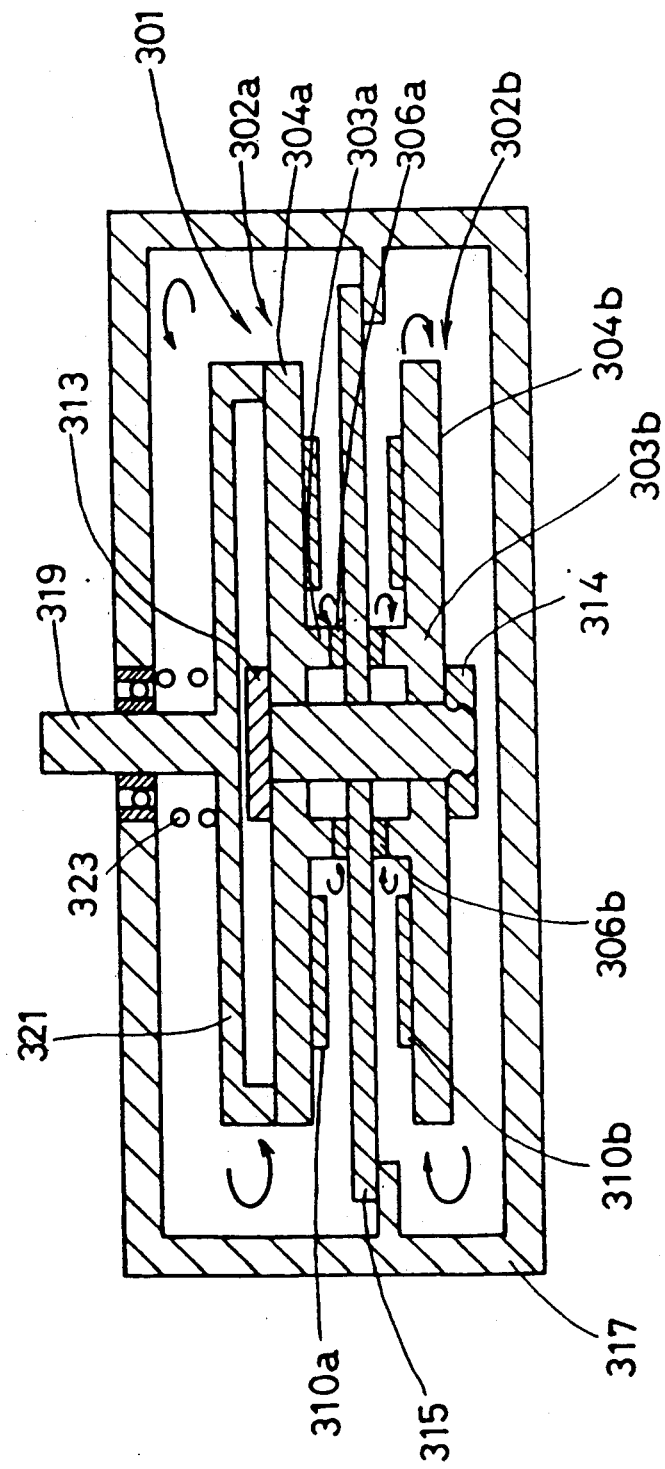
FIG. 5 is a sectional view of a related-art ultrasonic motor.

FIG. 3 is a side view of first and fourth piezoelectric elements 316a and 316b for causing shear vibration in the peripheral direction and a fixing plate 315 inserted therebetween. The first and fourth piezoelectric elements 316a and 316b are each composed of eight piezoelectric chips 201 arranged in a circle. Each piezoelectric chip 201 is cut out of a piezoelectric board 200 for causing thickness shear mode vibration. As shown in FIG. 3, in the first and fourth piezoelectric elements 316a and 316b, all the piezoelectric chips 201 are arranged so that they are polarized in the same direction. On the other hand, in the related art shown in FIG. 7, the first piezoelectric element 306a is polarized to point in a direction opposite to that of the second piezoelectric element 306b. In this embodiment illustrated in FIG. 4, the first and second related-art piezoelectric elements 306a and 306b are replaced with the first and fourth piezoelectric elements 316a and 316b.

The piezoelectric transducer 301 is fixed in a motor case 317 via the fixing plate 315. An output shaft 319 is rotatably supported by the motor case 317. One end of the output shaft protrudes out of the motor case 317. A rotor 321 is attached to the other end of the output shaft 319 inside the motor case 317. A spring 323 is interposed between the motor case 317 and the rotor 321, thus pushing the rotor 321 onto the resonance disk 304a of the piezoelectric transducer 301.

First and second elastic members 302a and 302b are provided with second and third axial piezoelectric elements 310a and 310b for causing flexural vibration of the first and second elastic members 302a and 302b. The curved arrows in the FIG. 4 indicate the polarized directions of the first and fourth piezoelectric elements 316a and 316b.

The outside electrodes of the first and fourth piezoelectric elements 316a and 316b are connected to each other. Likewise, the inside electrodes of the first and fourth piezoelectric elements 316a and 316b are connected to each other. Simultaneously, an alternating current electric signal is applied to both the inside and the outside electrodes.

In operation, the first and fourth piezoelectric elements 316a and 316b are excited in the same mode, thereby causing shear vibration in the same direction as the first and the second elastic members 302a and 302b.

If aluminum disks of 60 mm outside diameter and 3.5 mm thickness are used as the resonance disks 304a and 304b of the first and the second elastic members 302a and 302b, respectively, the amplitude of peripheral shear vibration of the resonance disks 304a and 304b in the peripheral direction measures approximately 1 $\mu$m on the peripheries thereof at 25 volts applied to the first and fourth piezoelectric elements 316a and 316b. Under these conditions, the rotational speed of the output shaft measures 100 r.p.m.

In this embodiment, all the piezoelectric chips 201 of the first and fourth piezoelectric elements 316a and 316b are so arranged that they are polarized in the same direction. In this way, the first and fourth piezoelectric elements 316a and 316b generate torsional vibration in the peripheral direction in the same phase. Needless to say, the same result will occur when the piezoelectric chips 201 of the first and fourth piezoelectric elements 316a and 316b are polarized in opposite directions and the phase of the applied voltage is inverted.

As is clearly shown in the description above, the piezoelectric transducer and the ultrasonic motor of the present invention effectively transmit the vibration energy of the piezoelectric elements because insulating ceramics are used as the insulators.

In accordance with the present invention, the amplitude in the peripheral direction of a piezoelectric transducer can be greatly amplified. Furthermore, the rotational speed of an ultrasonic motor using the piezoelectric transducer of the present invention can be greatly increased.

What is claimed is:
1. A piezoelectric transducer comprising:
    a first elastic member;
    a first piezoelectric vibrator attached to the first elastic member for causing the elastic member to vibrate in a first direction;
    a first insulating element attached to the first piezoelectric vibrator, the first insulating element being comprised of ceramic insulation material;
    a second piezoelectric vibrator attached to the first insulating element for causing the elastic member to vibrate in a second direction normal to the first direction; wherein the first insulating element electrically insulates the first piezoelectric vibrator from the second piezoelectric vibrator;
    a second elastic member;
    a third piezoelectric vibrator for causing the second elastic member to vibrate in the second direction;
    a second insulating element attached to the third piezoelectric vibrator; and
    a fourth piezoelectric vibrator for causing the second elastic member to vibrate in the first direction; wherein
    the second insulating element electrically insulates the third piezoelectric vibrator from the fourth piezoelectric vibrator.
2. The piezoelectric transducer of claim 1, in which:
    the first piezoelectric vibrator comprises a piezoelectric element and first and second electrodes, where the first electrode is connected to the elastic member and the second electrode contacts the first insulating element; and
    the second piezoelectric vibrator comprises a piezoelectric element and third and fourth electrodes, where the third electrode contacts the first insulating element.
3. The piezoelectric transducer of claim 2, in which:
    the first and second electrodes are connected to a first alternating current voltage source; and
    the third and fourth electrodes are connected to a second alternating current voltage source.
4. The piezoelectric transducer of claim 2 further comprising:
    a ceramic fixing plate, where the fourth electrode is attached to a first side of the fixing plate; wherein
    the third piezoelectric vibrator comprises a piezoelectric element and fifth and sixth electrodes, where the third piezoelectric vibrator is attached to a second side of the fixing plate such that the fifth electrode contacts the fixing plate; wherein
    the second insulating element is attached to the third piezoelectric vibrator such that the sixth electrode contacts the second insulating element; wherein
    the fourth piezoelectric vibrator comprises a piezoelectric element and seventh and eighth electrodes, where the fourth piezoelectric vibrator is attached to the second insulating element such that the seventh electrode contacts the second insulating element; wherein
    the second elastic member is attached to the fourth piezoelectric vibrator such that the eighth electrode contacts the second elastic member;
    the first and second elastic members are coaxial discs, each having a cylindrical portion and a common axis, where the first and second elastic members resonate in a shear vibration mode and in flexural vibration mode; and
    the first, second, third, and fourth piezoelectric vibrators and the first and second insulating elements are cylindrically shaped and are symmetrical about the common axis, with the first vibrator being attached to the cylindrical portion of the first elastic member and the fourth vibrator being attached to the cylindrical portion of the second elastic member.

5. The piezoelectric transducer of claim 4, in which: the first, second, seventh, and eighth electrodes are connected to a first alternating current voltage source; and the third, fourth, fifth, and sixth electrodes are connected to a second alternating current voltage source.

6. The piezoelectric transducer of claim 5, in which: the piezoelectric elements of the first and fourth piezoelectric vibrators are polarized to vibrate in the first direction to cause the elastic member to vibrate in the shear mode; and vibration in the second direction causes the elastic member to vibrate in the flexural mode.

7. The piezoelectric transducer of claim 4, in which: the first and second electrodes are connected to a first alternating current voltage source;

the third, fourth, fifth, and sixth electrodes are connected to a second alternating current voltage source;

the seventh and eighth electrodes are connected to a third alternating current voltage source having a phase inverted from that of the first alternating current source;

the piezoelectric elements of the first and fourth piezoelectric vibrators are polarized to vibrate in opposite directions such that first and second piezoelectric vibrators vibrate in the first direction to cause the first and second elastic members to vibrate in the shear mode, respectively; and vibration in the second direction causes the elastic member to vibrate in the flexural mode.

8. The piezoelectric transducer of claim 1, in which the insulating element is comprised of metal coated with thermal-sprayed insulating ceramics.

9. A piezoelectric transducer comprising:

first and second disc-shaped elastic bodies having a common axis, where each elastic body resonates in a shear vibration mode and a flexural vibration mode;

a fixing plate between the elastic bodies;

a first piezoelectric vibrator held between the first elastic body and the fixing plate for causing the first elastic body to vibrate in a first direction in the shear vibration mode;

a second piezoelectric vibrator held between the second elastic body and the fixing plate for causing the second elastic body to vibrate in the first direction in the shear vibration mode;

a third piezoelectric vibrator held between the first elastic body and the fixing plate for causing flexural vibration of the first elastic body;

a fourth piezoelectric vibrator held between the second elastic body and the fixing plate for causing flexural vibration of the second elastic body; and a holding means for contacting the first and second elastic bodies at the common axis to hold the first and third piezoelectric vibrators between the first elastic body and the fixing plate and to hold the second and fourth piezoelectric vibrators between the fixing plate and the second elastic body.

10. The piezoelectric transducer of claim 9, in which the first and second piezoelectric vibrators are comprised of a plurality of piezoelectric elements polarized such that the first and second piezoelectric vibrators vibrate in the first direction.

11. The piezoelectric transducer of claim 10, in which each of the first and second elastic bodies have a protruding cylindrical portion concentric with the elastic bodies and the first and second piezoelectric vibrators are cylindrically shaped and symmetrical about the common axis and contact the cylindrical portions of the first and second elastic bodies, respectively.

12. The piezoelectric transducer of claim 11, in which each piezoelectric element is a segment of a cylinder formed such that the segment vibrates in a direction tangential to the periphery of the cylinder and each piezoelectric vibrator is comprised of a plurality of segments assembled to form a cylindrical piezoelectric element with all segments arranged such that the segments are polarized to vibrate in the same rotational direction.

13. The piezoelectric transducer of claim 11, in which the segments of the first and second piezoelectric vibrators are polarized to vibrate in the same rotational direction and an identical alternating current voltage signal is applied to the first and second piezoelectric vibrators.

14. The piezoelectric transducer of claim 12, in which the segments of the first piezoelectric vibrator are polarized to vibrate in a first rotational direction, the segments of the second piezoelectric vibrator are polarized to vibrate in a rotational direction opposite to the first direction, and an alternating current voltage signal applied to the first piezoelectric vibrator has a phase inverted from the phase of an alternating current voltage signal applied to the second piezoelectric vibrator.

* * * * *